United States Patent
Tagami et al.

(10) Patent No.: US 9,046,643 B2
(45) Date of Patent: Jun. 2, 2015

(54) OPTICAL SCANNING ELEMENT AND IMAGE DISPLAY DEVICE USING THE SAME

(75) Inventors: Kenji Tagami, Tokyo (JP); Fujio Okumura, Tokyo (JP)

(73) Assignee: NEC CORPORATION, Tokyo (JP)

(*) Notice: Subject to any disclaimer, the term of this patent is extended or adjusted under 35 U.S.C. 154(b) by 378 days.

(21) Appl. No.: 13/700,919

(22) PCT Filed: May 18, 2011

(86) PCT No.: PCT/JP2011/061417
§ 371 (c)(1),
(2), (4) Date: Nov. 29, 2012

(87) PCT Pub. No.: WO2011/152215
PCT Pub. Date: Dec. 8, 2011

(65) Prior Publication Data
US 2013/0070167 A1    Mar. 21, 2013

(30) Foreign Application Priority Data
Jun. 2, 2010 (JP) ................. 2010-126732

(51) Int. Cl.
*G02B 26/08* (2006.01)
*G02B 5/08* (2006.01)

(52) U.S. Cl.
CPC .......... *G02B 5/0833* (2013.01); *G02B 26/0858* (2013.01)

(58) Field of Classification Search
CPC .......... G02B 27/0172; G02B 26/0833; G02B 26/0858; G02B 5/0833

USPC ............. 359/196.1–226.2, 586–587, 589; 353/32; 348/756

See application file for complete search history.

(56) References Cited

U.S. PATENT DOCUMENTS 5,629,790 A * 5/1997 Neukermans et al. ..... 359/198.1

FOREIGN PATENT DOCUMENTS

| JP | H05341121 A | 12/1993 |
| JP | 2001249300 A | 9/2001 |
| JP | 2006071678 A | 3/2006 |
| JP | 2007271909 A | 10/2007 |
| JP | 2008015001 A | 1/2008 |
| JP | 2009222859 A | 10/2009 |

OTHER PUBLICATIONS

The international search report for PCT/JP2011/061417 mailed on Jun. 14, 2011.

* cited by examiner

*Primary Examiner* — James Phan
(74) *Attorney, Agent, or Firm* — Sughrue Mion, PLLC (57) ABSTRACT

Provided is an optical scanning element that includes mirror unit 1, and movable unit 2 including mounting unit 7 on which mirror unit is mounted and which is configured to be rotatable. Mirror unit 1 includes: a dielectric multilayer film that reflects a part of incident light while transmitting the remainder of the light; and a first substrate on one surface of which the dielectric multilayer film is formed, and which transmits the remainder of the light passed through the dielectric multilayer film. Mounting unit 7 includes a through-hole at a portion facing the dielectric multilayer film.

12 Claims, 7 Drawing Sheets

OPTICAL SCANNING ELEMENT AND IMAGE DISPLAY DEVICE USING THE SAME

This application is a National Stage Entry of PCT/JP2011/061417 filed May 18, 2011, which claims priority from Japanese Patent Application 2010-126732 filed Jun. 2, 2010, the contents of all of which are incorporated herein by reference, in their entirety.

TECHNICAL FIELD

The present invention relates to an optical scanning element that scans a screen with an optical beam, and more particularly to an optical scanning element that includes a rotatable mirror.

BACKGROUND ART

Patent Literature 1 describes a light deflector that includes an oscillating body including a mirror and a torsion spring for rotatably supporting the mirror, a fixing unit to which the oscillating body is fixed, and a driving unit configured to reciprocally vibrate the mirror by deforming the torsion spring with its resonance frequency.

The mirror includes a base made of silicon. A refection film made of metal U (Al or Au) is formed on the base.

In the aforementioned light deflector, the temperature of the reflection film rises due to absorption of a part of incident light on the reflection film. As a result, distortion occurs in the mirror (especially, in the base) because of thermal expansion. When the distortion occurs in the mirror, accurate scanning with the optical beam is difficult.

The temperature increase causes a change in rigidity of the torsion spring, thereby changing the resonance frequency of the torsion spring. The change of the resonance frequency of the torsion spring is accompanied by the change of a deflection angle. As a result, accurate scanning with the optical beam is difficult.

Thus, Patent literature 1 describes a light deflector that has a heat releasing structure. This light deflector includes, in addition to the oscillating body, the fixing unit, and the driving unit described above, a solid heat transfer body that covers the oscillating body. The solid heat transfer body is made of metal such as Al. Heat generated by light absorption is released from the reflection film through the solid heat transfer body to the outside.

Further, Patent Literature 2 describes an image display device that includes a light source, a MEMS mirror configured to scan a screen with an optical beam from the light source, an auxiliary light source configured to irradiate the MEMS mirror with an optical beam, and control means for controlling power of the auxiliary light source to keep the temperature of the MEMS mirror constant.

The MEMS mirror includes a mirror unit including a dielectric multilayer film, a first substrate on which the mirror unit is mounted, two beams for rotatably supporting the first substrate, and a second substrate to which the beams are fixed. The beams and the second substrate correspond to the aforementioned torsion spring.

In the MEMS mirror, a part of incident light from the light source is reflected on the dielectric multilayer film, and the remainder of the light is absorbed by the dielectric multilayer film or the first substrate. Reflectance of the dielectric multilayer film in the wavelength region of the light from the light source is 98% or higher.

The light from the auxiliary light source is also applied to the mirror unit of the MEMS mirror. The wavelength region of the auxiliary light source is different from that of the light source. Reflectance of the dielectric multilayer film in the wavelength region of the auxiliary light source is several %. Accordingly, most of the light from the auxiliary light source is absorbed by the dielectric multilayer film or the first substrate.

In the image display device, the control means controls the amount of light emitted from the auxiliary light source so that the sum total of the energy amount of the light emitted from the light source and absorbed by the mirror unit and the energy amount of the light emitted from the auxiliary light source and absorbed by the mirror unit can be constant.

CITATION LIST

Patent Literature

Patent Literature 1: JP2007-271909A
Patent Literature 2: JP2008-15001A

DISCLOSURE OF THE INVENTION

However, in the light deflector having the heat releasing structure described in Patent Literature 1, because of the structure where the mirror comes into contact with the solid heat transfer body, the mirror must be reciprocally vibrated together with the solid heat transfer body.

A resonance frequency in this case is lower than that when the mirror is reciprocally vibrated independently. The reduced resonance frequency causes reduction of the scanning speed and a change of the deflection angle. As a result, high-speed and accurate scanning with the optical beam is difficult.

Recently, to achieve high luminance of a displayed image, there is a tendency to increase the output of the light source for emitting a beam. For example, light sources of more than a dozen W to several tens of W may be used. When such a light source of a high output is used, it is difficult to prevent a temperature increase in the mirror by only the heat releasing effect of the solid heat transfer body. Especially, since the base and the reflection film are made of incident light absorbing materials, the light deflector described in Patent Literature 1 is easily affected by the temperature increase caused by as increase in the output of the light source.

In the image display device described in Patent Literature 2, because of the use of the auxiliary light source, the cost and size of the device have increased.

In the MEMS mirror, 98% of the entire incident light is reflected on the dielectric multilayer film, while remaining 2% is absorbed by the dielectric multilayer film or the first substrate. When the aforementioned light source of the high output is used, even in the case of 2% of the light, its absorption increases the temperature of the dielectric multilayer film or the first substrate, consequently causing distortion of the mirror or a change in rigidity of the torsion spring.

It is therefore an object of the present invention to provide an optical scanning element that can solve the aforementioned problems and prevent the temperature increase in a mirror unit, and in an image display device using the same.

Solution to Problem

To achieve the object, an optical scanning element according to the present invention includes: a dielectric multilayer film that reflects a part of incident light while transmitting the remainder of the light; a first substrate on one surface of which the dielectric multilayer film is formed, and which transmits the remainder of the light passed through the dielectric multilayer film; and a movable unit which includes a mounting unit on which the first substrate is mounted, the movable unit being configured so that the mounting unit can be rotated. The mounting unit includes a through-hole at a portion facing the dielectric multilayer film.

An image display device according to the present invention includes: a light source; a first optical scanning element that scans a screen with an optical beam from the light source in a first direction; a second optical scanning element that scans the screen with an optical beam from the first optical scanning element in a second direction intersecting the first direction; and a control unit that controls, based on an input video signal, the first and second optical scanning elements and the irradiation timing of the laser light source. Each of the first and second optical scanning elements includes the aforementioned optical scanning element according to the present invention.

DESCRIPTION OF REFERENCE NUMERALS

1 Mirror unit
2 Movable unit
3 Base
4 Absorption member
5 Dielectric multilayer film
6 Mirror substrate
7 Mounting unit

DESCRIPTION OF EMBODIMENTS

Hereinafter, the exemplary embodiments of the present invention will be described with reference to the drawings.

(First Exemplary Embodiment)

Figure 1:
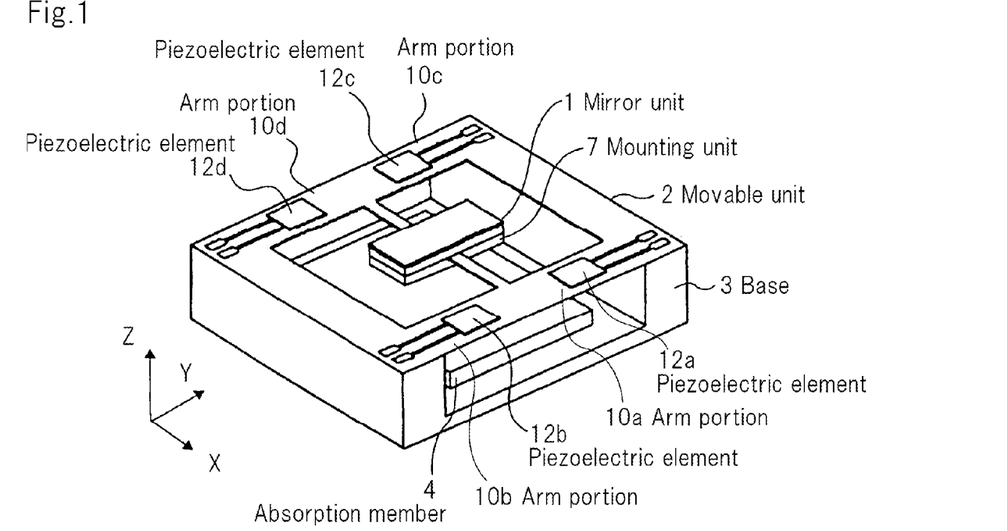
FIG. 1 is a perspective view schematically showing the configuration of an optical scanning element according to the first exemplary embodiment of the present invention.
Figure 2:
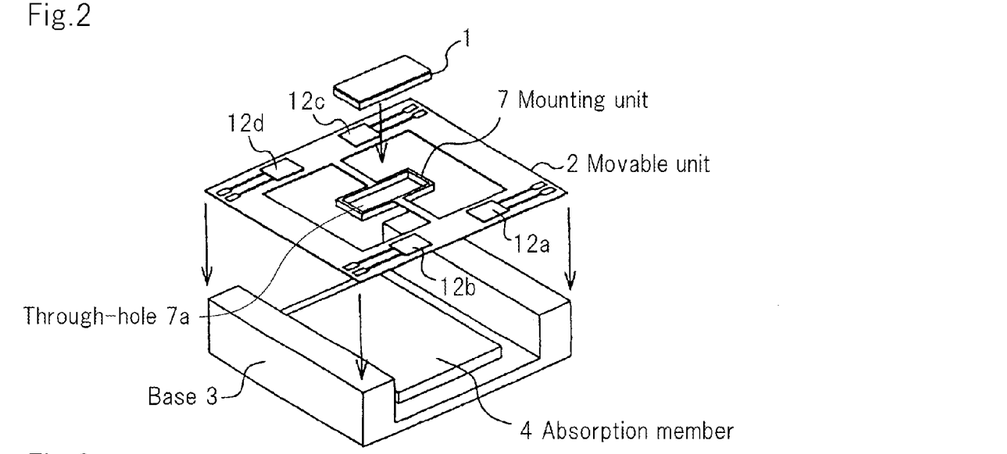
FIG. 2 is an exploded perspective view showing the main components of the optical scanning element shown in FIG. 1.

FIG. 1 is a perspective view schematically showing the configuration of an optical scanning element according to the first exemplary embodiment of the present invention. FIG. 2 is an exploded perspective view showing the main components of the optical scanning element.

Referring to FIGS. 1 and 2, the optical scanning element, which is used for a projection display device for scanning a screen with a laser beam to form an image, includes mirror unit 1, movable unit 2, base 3, and absorption member 4.

Figure 3:
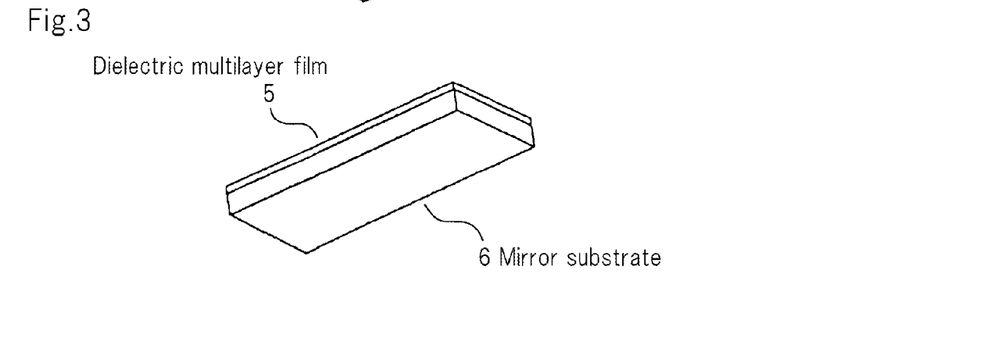
FIG. 3 is a schematic view showing an example of the mirror unit of the optical scanning element shown in FIG. 1.

FIG. 3 is a schematic view showing an example of mirror unit 1. As shown in FIG. 3, mirror unit 1 includes dielectric multilayer film 5 that reflects a part of incident light while transmitting the remainder of the light, and mirror substrate 6 on one surface of which dielectric multilayer film 5 is formed and which transmits the remainder of the light passed through dielectric multilayer film 5.

Dielectric multilayer film 5 has high reflectance in the wavelength region of a used laser beam, and the light absorbance of the wavelength region is nearly 0%.

Figure 4:
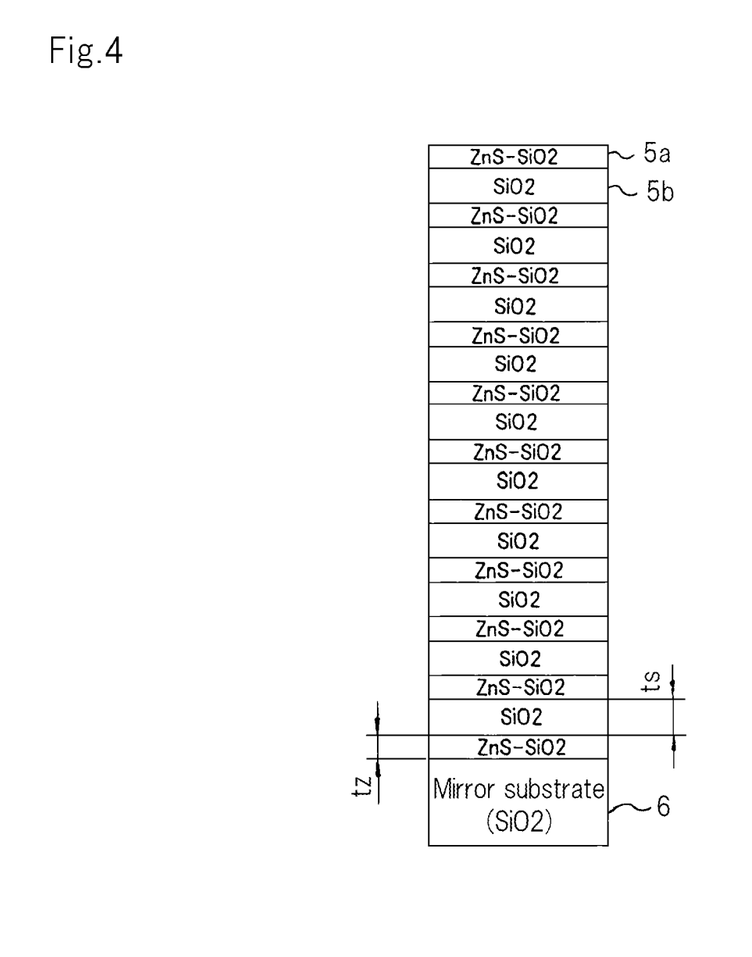
FIG. 4 is a schematic view showing an example of the dielectric multilayer film of the optical scanning element shown in FIG. 1.

FIG. 4 is a schematic view showing an example of dielectric multilayer film 5. In this example, dielectric multilayer film 5 has a structure where ZnS—$SiO_2$ layers 5a and $SiO_2$ layers 5b are alternately stacked. The film thickness tz of ZnS—$SiO_2$ layer 5a is, for example, 47.1 nm. The film thickness is of $SiO_2$ layer 5b is, for example, 69.1 nm.

According to dielectric multilayer film 5 having the laminate structure, in the wavelength region of 405 nm, reflectance of about 99% can be achieved, and light absorbance in the wavelength region can be nearly 0%.

Generally, the dielectric multilayer film has incident angle dependence where reflectance changes depend on a light incident angle. However, the influence of the incident angle dependence can be prevented by limiting wavelength regions (wavelength regions of incident light) that are used.

Figure 5:
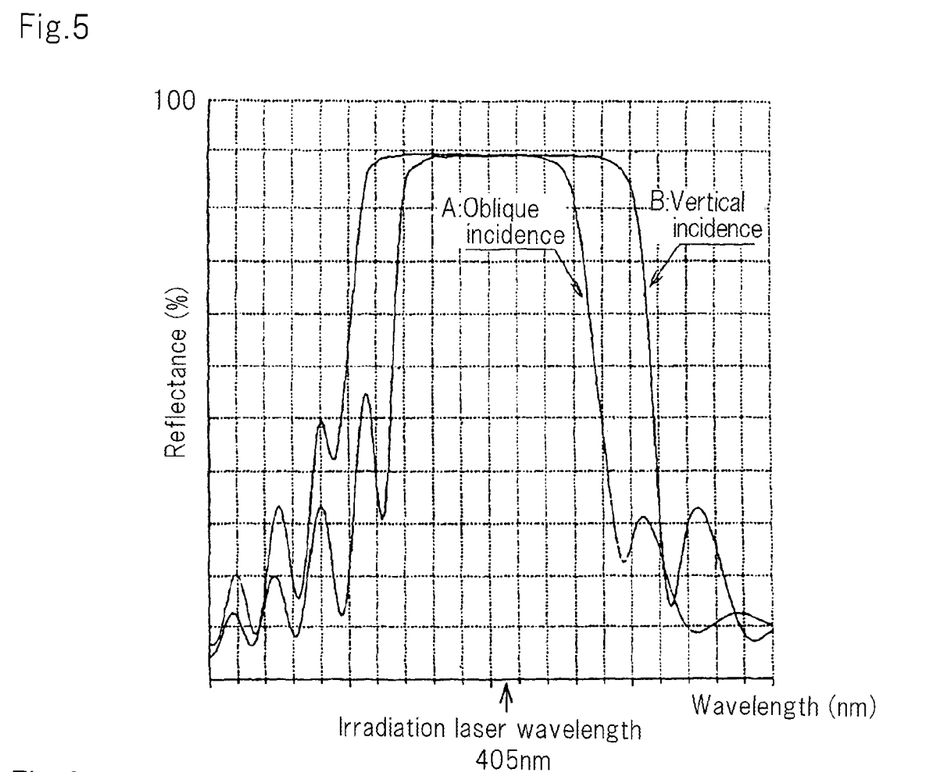
FIG. 5 is a characteristic diagram showing the spectral reflection characteristics of the dielectric multilayer film shown in FIG. 4.

FIG. 5 is a characteristic diagram showing an example of the spectral reflection characteristics of the dielectric multilayer film. A vertical axis indicates reflectance (%), and a horizontal axis indicates a wavelength (nm). Curve A indicates spectral reflection characteristics when light obliquely enters a film surface (e.g. at incident angle of 25°), and curve B indicates spectral reflection characteristics when the light vertically enters the film surface.

As shown in FIG. 5, when dielectric multilayer film 5 is irradiated with a laser beam having a wavelength of about 405 nm, reflectance of about 99% can be achieved in both cases of oblique incidence and vertical incidence. Absorbance of the laser beam is roughly 0% in both cases of oblique incidence and vertical incidence, and light of about 1% is transmitted through dielectric multilayer film 5.

Referring again to FIGS. 1 to 3, mirror substrate 6 is made of a material (specifically, material having a transmittance of roughly 100% in the wavelength region of laser beam) having spectral transmittance characteristics, which is plate-like and transparent to the laser beam applied to dielectric multilayer film 5. For example, as materials having spectral transmission characteristics transparent to the light having the wavelength region of 405 nm, there are $SiO_2$, $CaF_2$, and $MgF_2$.

Movable unit 2 includes mounting unit 7 on which mirror substrate 6 is mounted. Movable unit 2 is configured so that mounting unit 7 can be rotated. Mounting unit 7 includes through-hole 7a. Among laser beams applied to mirror unit 1, a beam transmitted through dielectric multilayer film 5 and mirror substrate 6 passes through through-hole 7a. The position and the size of through-hole 7a are designed such that the transmitted beam is not blocked by mounting unit 7.

Figure 6:
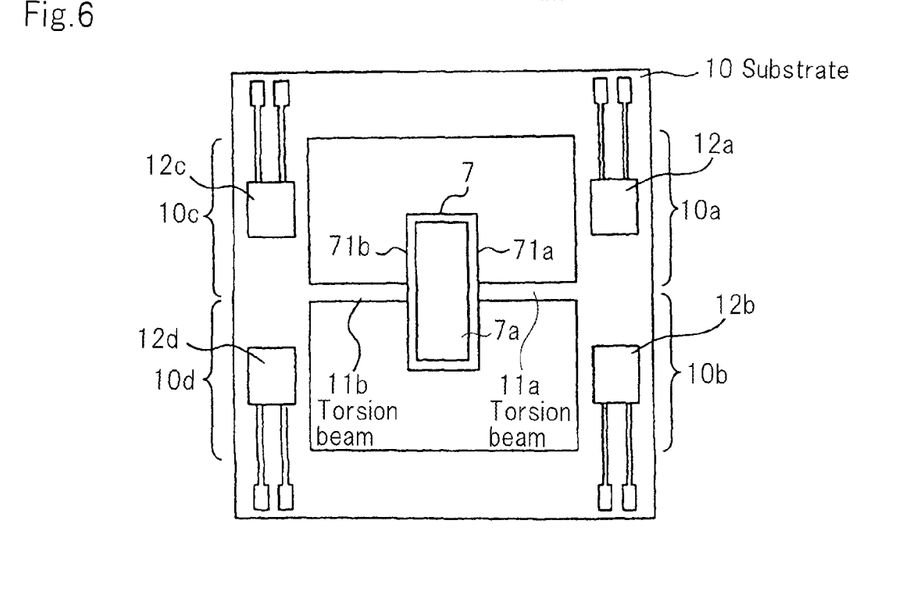
FIG. 6 is a top view showing the movable unit of the optical scanning element shown in FIG. 1.

FIG. 6 is a top view of movable unit 2. As shown in FIG. 6, movable unit 2 includes two torsion beams 11a and 11b which rotatably support mounting unit 7, and frame-shaped substrate 10 to which torsion beams 11a and 11b are fixed. Mounting unit 7, torsion beams 11a and 11b, and substrate 10 can be made of, for example, Si, and integrally formed. The length and the width of the torsion beam 11a are nearly equal to those of torsion beam 11b.

When seen from a direction vertical to the surface of substrate 10, mounting unit 7 is located almost on the center of the opening (within frame) of substrate 10. Frame-shaped mounting unit 7 includes first and second opposing sides 71a and 71b. The center (specifically, position of center of gravity) of first side 71a is fixed to substrate 10 via torsion beam 11 a, and the center (specifically, position of center of gravity) of second side 71b is fixed to substrate 10 via torsion beam 11b.

Substrate 10 includes first and second opposing arms. One end of torsion beam 11a is fixed to the center of the first arm, and one end of torsion beam 11b is fixed to the center of the second arm. The length and the width of the first arm are nearly equal to those of the second arm.

The first arm includes arm portion 10a extending toward one side from the center, and arm portion 10b extending toward the other side. Piezoelectric element 12a is arranged on arm portion 10a, and piezoelectric element 12b is arranged on arm portion 10b.

The second arm includes arm portion 10c extending toward one side from the center, and arm portion 10d extending toward the other side. Piezoelectric element 12c is arranged on arm portion 10c, and piezoelectric element 12d is arranged on arm portion 10d.

Referring again to FIGS. 1 to 3, substrate 10 of movable unit 2 is fixed to base 3 of U-shaped cross section. Base 3 includes first and second opposing convex portions. Substrate 10 includes first and second fixed portions extending in a direction that intersects the first and second arms. The first fixed portion faces the second fixed portion. The first fixed portion is fixed to the first convex portion, and the second fixed portion is fixed to the second convex portion.

Absorption member 4, which is made of a material for absorbing light of a specific wavelength region including that of the laser beam applied to mirror unit 1, absorbs, from among the laser beams applied to mirror unit 1, the beam that is transmitted through dielectric multilayer film 5 and mirror substrate 6. Absorption member 4 is disposed in the entire area of the concave portion of base 3 opposite dielectric multilayer film 5 and irradiated with the transmitted beam.

Base 3 can be made of a material or formed into a structure capable of releasing heat generated by light absorption at absorption member 4.

Next, the operation of the optical scanning element according to this embodiment will be described.

First, the operation of reciprocally vibrating mirror unit 1 will be described.

Mirror unit 1 is reciprocally vibrated by supplying a voltage based on a first driving signal to piezoelectric elements 12a and 12c and by supplying a voltage based on a second driving signal to piezoelectric elements 12b and 12d. In this case, the first driving signal is reverse in phase to the second driving signal.

Figure 7A:
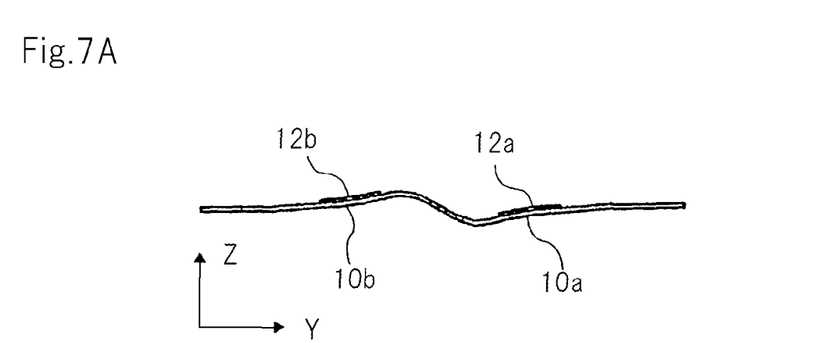
FIG. 7A is a schematic view showing the deformed state of the first arm of the movable unit of the optical scanning element shown in FIG. 1.
Figure 7B:
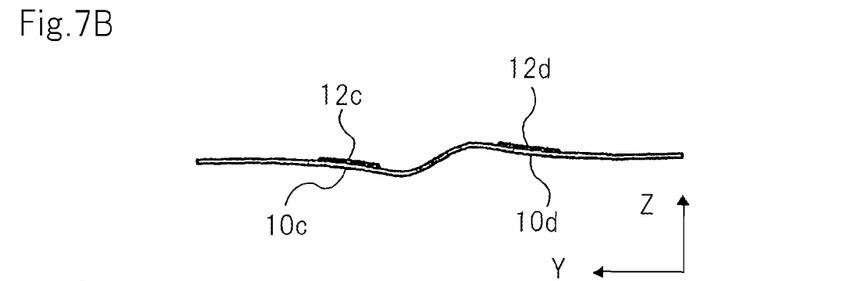
FIG. 7B is a schematic view showing the deformed state of the second arm of the movable unit of the optical scanning element shown in FIG. 1.

FIG. 7A is a schematic view showing the deformed state of arm portions 10a and 10b of substrate 10 when voltage based on the first driving signal is supplied to piezoelectric element 12a and when voltage based on the second driving signal is supplied to piezoelectric element 12b. FIG. 7B is a schematic view showing the deformed state of arm portions 10c and 10d of substrate 10 when voltage based on the first driving signal is supplied to piezoelectric element 12c and when voltage based on the second driving signal is supplied to piezoelectric element 12d.

At the half cycles of the first and second driving signals, arm portions 10a and 10b are set in the deformed state shown in FIG. 7A, and arm portions 10c and 10d are set in the deformed state shown in FIG. 7B. In these states, the portion (hereinafter, first end side) of mounting unit 7 on the side of arm portions 10a and 10b is higher than the surface of substrate 10, and the portion (hereinafter, second end side) of mounting unit 7 on the side of arm portions 10c and 10d is lower than the surface of substrate 10.

At the remaining half cycles of the first and second driving signals, the state of arm portions 10a and 10b and the state of arm portions 10c and 10d are reverse to each other. That is, arm portions 10a and 10b are set in the deformed state shown in FIG. 7B, and arm portions 10c and 10d are set in the deformed state shown in FIG. 7A. In these states, the first end side of mounting unit 7 is lower than the surface of substrate 10, and the second end side of mounting unit 7 is higher than the surface of substrate 10.

By setting frequencies of the first and second driving signals nearly equal to the resonance frequencies of torsion beams 11a and 11b, torsion beams 11a and 11b can be deformed based on these resonance frequencies. Accordingly, mirror unit 1 mounted on mounting unit 7 is reciprocally vibrated. This reciprocal vibration enables spatial scanning with the incident laser beam.

Next, a principle for preventing temperature increases at mirror unit 1 and mounting unit 7 during light irradiation will be described.

Figure 8:
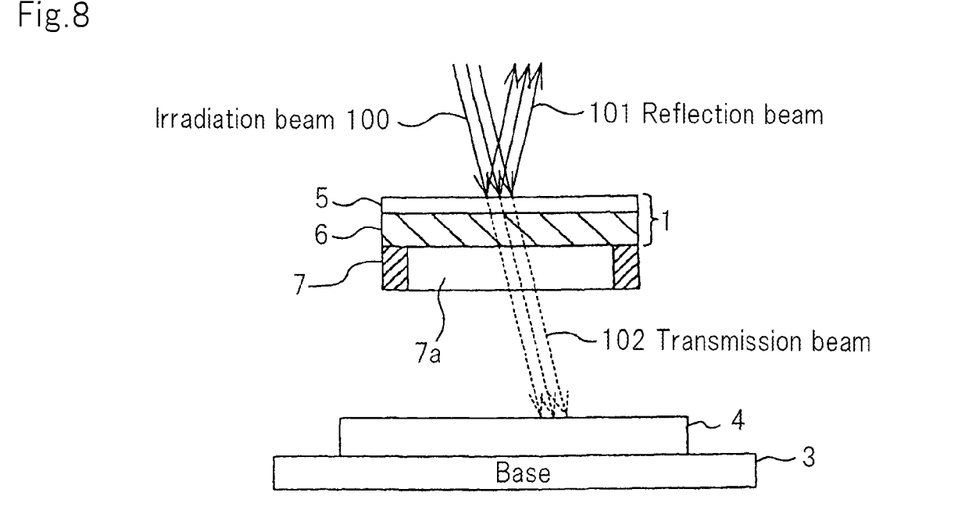
FIG. 8 is an explanatory schematic view showing a principle for preventing a temperature increase.

FIG. 8 is an explanatory schematic view showing the principle for suppressing a temperature increase. As shown in FIG. 8, when dielectric multilayer film 5 is irradiated with irradiation beam (laser beam) 100, a part of irradiation beam (laser beam) 100 is reflected on dielectric multilayer film 5, while the remainder of the beam is transmitted through dielectric multilayer film 5.

In the wavelength region of irradiation beam 100, the light absorbance of dielectric multilayer film 5 is nearly 0, and thus the light absorbance causes no increase in the temperature of dielectric multilayer film 5. Irradiation beam 100 is divided into reflection beam 101 and transmission beam 102 by dielectric multilayer film 5.

Transmission beam 102 is transmitted through mirror substrate 6. In the wavelength region of irradiation beam 100, the light absorbance of mirror substrate 6 is nearly 0, and thus the light absorbance causes no increase in the temperature of mirror substrate 6.

Transmission beam 102 transmitted through mirror substrate 6 passes through through-hole 7a of mounting unit 7, and then reaches absorption member 4. Transmission beam 102 is absorbed by absorption member 4. In absorption member 4, light energy is converted into thermal energy, and the temperature of absorption member 4 increases. The thermal energy is transferred from absorption member 4 to base 3, and then is released from the outer surface of base 3 to the outside (heat releasing).

In the reciprocally vibrated state of mirror unit 1, the position and the size of through-hole 7a are designed such that transmission beam 102 is not blocked by a part of mounting unit 7. Thus, transmission beam 102 always passes through through-hole 7a not to be absorbed by mounting unit 7.

The optical scanning element according to this embodiment is an example of the present invention, and its configuration can appropriately be changed without departing from the gist of the invention.

Figure 9:
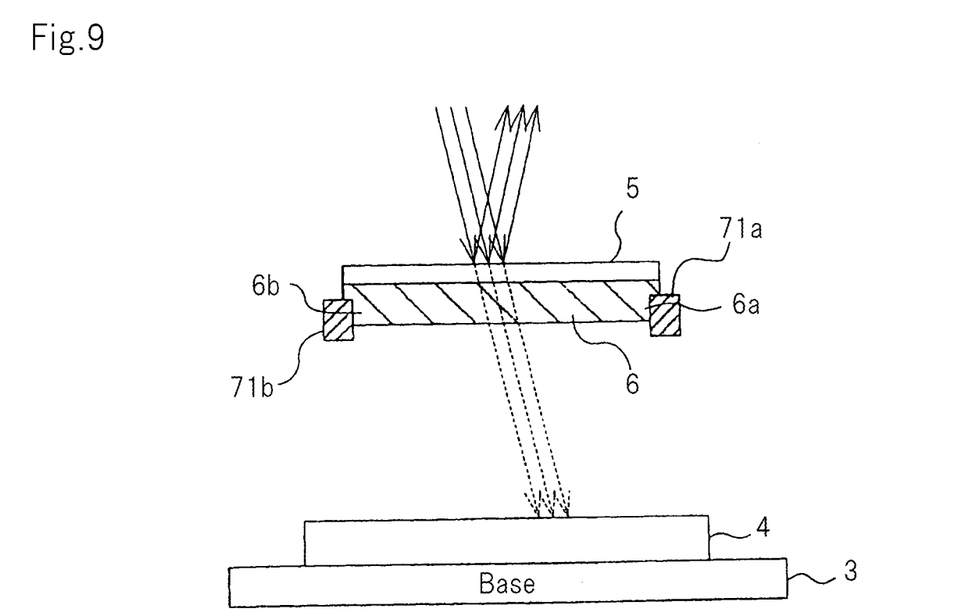
FIG. 9 is a schematic view showing an example of the engagement structure of the mirror unit and the movable unit included in the optical scanning element shown in FIG. 1.

For example, an engagement structure, in which mirror substrate 6 is fixed to mounting unit 7, can be employed. FIG. 9 is a schematic view showing an example of such an engagement structure.

Referring to FIG. 9, engagement units 6a and 6b having hook-shaped cross sections are provided to both ends of mirror substrate 6 which are fixed to mounting unit 7. The cross sectional shapes of first and second sides 71a and 71b of mounting unit 7 are square. The shape of engagement unit 6a matches that of the corner of first side 71a, and the shape of engagement unit 6b matches that of the corner of second side 71b.

According to such an engagement structure, by fitting engagement units 6a and 6b of mirror substrate 6 to the corners of first and second sides 71a and 71b of mounting unit 7, mirror substrate 6 and mounting unit 7 can be easily and accurately positioned.

Further, in the optical scanning element according to this embodiment, to reduce the weight of mirror unit 1, a concave portion can be formed on a surface opposite the surface of mirror substrate 6 where dielectric multilayer film 5 is formed.

Figure 10:
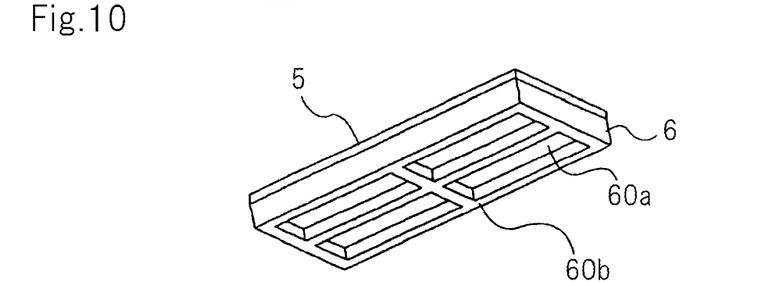
FIG. 10 is a schematic view showing an example of the weight reduction structure of a mirror substrate included in the optical scanning element shown in FIG. 1.

FIG. 10 shows an example of the weight reduction structure of mirror substrate 6. In this example, four concave portions 60a are formed on a surface (rear surface) opposite the surface of mirror substrate 6 where dielectric multilayer film 5 is formed. Concave portions 60a are equal in size, and rectangular in shape when seen from a direction vertical to the rear surface. Each concave portion 60a has a rectangular cross sectional shape. Because of the inclusion of concave portions 60a, the weight of mirror substrate 6 is lower than that shown in FIG. 3. Reducing the weight of mirror substrate 6 enables an increase in the scanning speed.

Concave portions 60a are divided by lattice-shaped rib 60b. By rib 60b, rigidity of mirror substrate 6 is secured.

Figure 11:
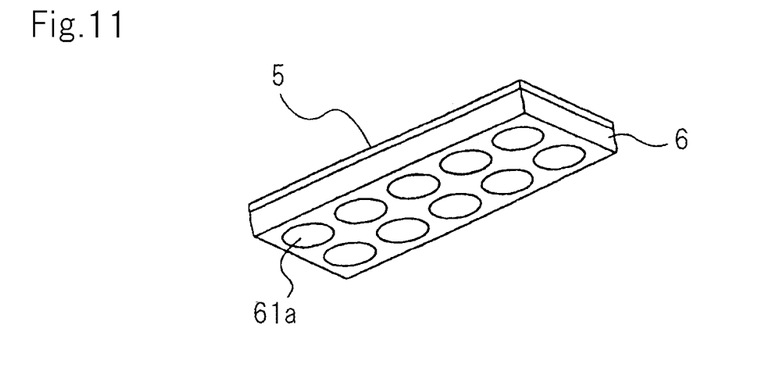
FIG. 11 is a schematic view showing another example of the weight reduction structure of the mirror substrate included in the optical scanning element shown in FIG. 1.

FIG. 11 shows another example of the weight reduction structure of mirror substrate 6. In this example, a plurality of regularly arranged concave portions 61a are formed on the surface (rear surface) opposite the surface of mirror substrate 6 where dielectric multilayer film 5 is formed. Concave portions 61a are equal in size, and circular in shape when seen from the direction vertical to the rear surface. Each concave portion 61a has a rectangular cross sectional shape. Because of the inclusion of concave portions 61a, the weight of mirror substrate 6 is lower than that shown in FIG. 3.

The periodic arrangement (2 rows and 5 columns) of concave portions 61a enables a part where no concave portion 61a is formed to secure rigidity of mirror substrate 6.

In the optical scanning element according to this embodiment, mounting unit 7 is not limited to the square shape. Mounting unit 7 can be formed into other shapes such as a circular shape. However, in view of processability, mounting unit 7 is desirably formed into a square shape.

In this embodiment, mounting unit 7, torsion beams 11a and 11b, and substrate 10 are made of, for example, Si.

However, these components can be made of sheet metals such as stainless steel. In such a case, there is an advantage of using cheaper elements than Si.

(Second Exemplary Embodiment)

Figure 12:
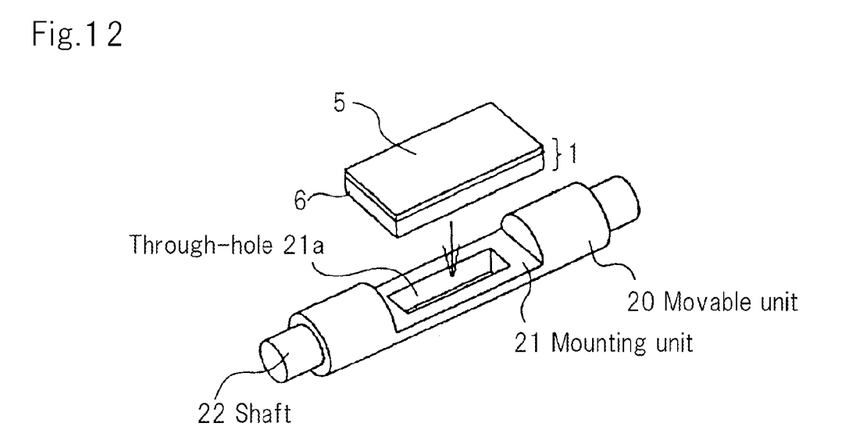
FIG. 12 is a perspective view schematically showing the configuration of an optical scanning element according to the second exemplary embodiment of the present invention.

FIG. 12 is a perspective view schematically showing the configuration of an optical scanning element according to the second exemplary embodiment of the present invention.

Referring to FIG. 12, the optical scanning element, which is used in a projection display device that forms an image by scanning a screen with a laser beam, mainly includes mirror unit 1 and movable unit 20. Mirror unit 1 is similar to that of the first exemplary embodiment (including modified example).

Movable unit 20 includes mounting unit 21 on which mirror unit 1 is mounted, and shaft 22 for rotatably supporting mounting unit 21.

Mounting unit 21 includes through-hole 21a, through which among laser beams that are applied to mirror unit 1, a laser beam that is transmitted through dielectric multilayer film 5 and mirror substrate 6 pass. The position and the size of through-hole 21a are designed such that the transmitted beam is not blocked by mounting unit 21.

One end of shaft 22 is rotatably fixed to a bearing unit (not shown). The other end of shaft 22 is connected to the output shaft of a motor via power transmission means such as a gear (not shown). Shaft 22 is parallel to the film surface of dielectric multilayer film 5, and a line passing through the center of the section of shaft 22 passes through the center of gravity of the film surface of dielectric multilayer film 5 when seen from a direction vertical to the film surface of dielectric multilayer film 5.

In the optical scanning element according to this embodiment, by driving the motor, mirror unit 1 is rotated around shaft 22. This enables spatial scanning with an incident laser beam.

In the optical scanning element according to this embodiment, by the same principle as that of the first exemplary embodiment for preventing the temperature increase (FIG. 8), the temperature increase of mirror unit 1 and mounting unit 21 is prevented.

Specifically, irradiation beam (laser beam) 100 is divided into reflection beam 101 and transmission beam 102 by dielectric multilayer film 5. Transmission beam 102 is transmitted through mirror substrate 6, and then passes through through-hole 21a of mounting unit 21.

In the wavelength region of irradiation beam 100, the light absorbance of dielectric multilayer film Sand mirror substrate 6 is nearly 0, and thus the light absorbance causes no increase in the temperature of dielectric multilayer film 5 and mirror substrate 6.

Transmission beam 102 transmitted through mirror substrate 6 passes through through-hole 21a of mounting unit 21. This prevents any increase in the temperature of mounting unit 21.

In this embodiment, as in the case of the first exemplary embodiment, an absorption member can be disposed in a position facing dielectric multilayer film 5 to absorb transmission beam 102 that passed through through-hole 21a of mounting unit 21.

(Third Exemplary Embodiment)

Figure 13:
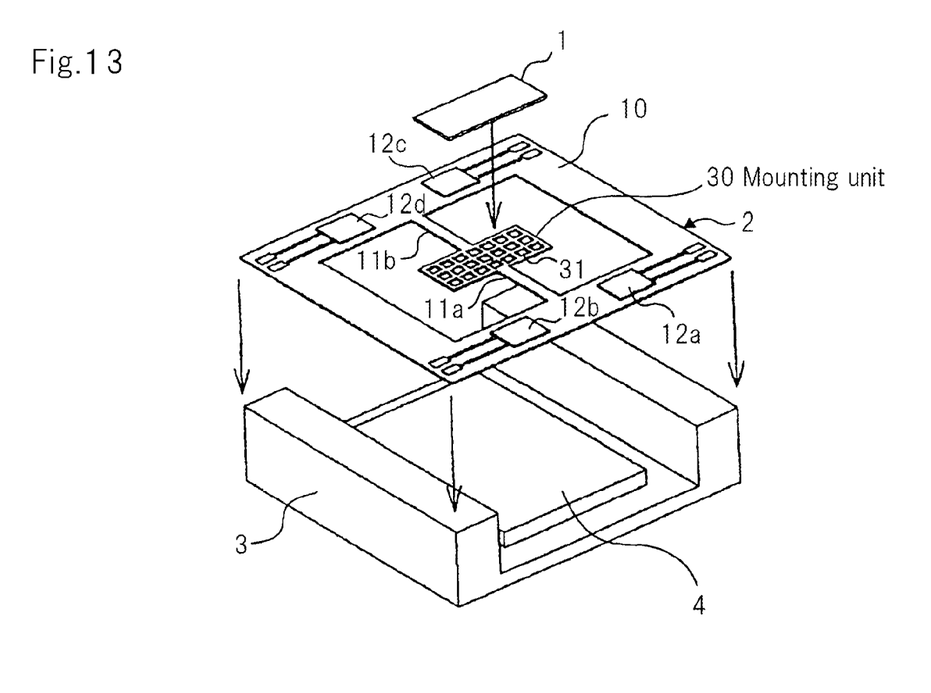
FIG. 13 is a perspective view schematically showing the configuration of an optical scanning element according to the third exemplary embodiment of the present invention.

FIG. 13 is a perspective view schematically showing the configuration of an optical scanning element according to the third exemplary embodiment of the present invention.

The optical scanning element according to this embodiment is similar to that of the first exemplary embodiment except for a mounting unit. In FIG. 3, components similar to those of the first exemplary embodiment are denoted by similar reference numerals. To avoid repeated description, detailed description of the similar components will be omitted.

Mounting unit 30 includes a lattice-shaped frame, and a plurality of through-holes 31 are formed by the frame. The sizes of through-holes 31 are nearly equal to one another. Mounting unit 30, torsion beams 11 and 11b, and substrate 10 can be made of, for example, Si, and integrally formed.

In the optical scanning element according to this embodiment, mirror unit 1 includes dielectric multilayer film 5 and mirror substrate 6 shown in FIG. 3. A beam transmitted through mirror unit 1 passes through each through-hole 31 of mounting unit 30. Accordingly, the temperature increase of dielectric multilayer film 5, mirror substrate 6, and mounting unit 30 can be prevented.

The transmitted beam that passed through each through-hole 31 of mounting unit 30 is absorbed by absorption member 4. In absorption member 4, light energy is converted into thermal energy, and the temperature of absorption member 4 increases. The thermal energy is transferred from absorption member 4 to base 3, and then released from the outer surface of base 3 to the outside (heat releasing).

In the optical scanning element according to this embodiment, a part of the transmitted beam is absorbed by the lattice-shaped portion of mounting unit 30. As compared with a mounting unit having no through-hole, the following effects can be provided.

In the mounting unit having no through-hole, most of the transmitted beam is absorbed by the mounting unit. This light absorbance increases the temperature of the mounting unit, thus causing distortion of the mirror unit or a change in rigidity of the beam.

On the other hand, in the optical scanning element according to this embodiment, a part of the transmitted beam is absorbed by the lattice-shaped portion of mounting unit 30, and the remainder of the transmitted beam passes through each through-hole 31 of mounting unit 30. Accordingly, the light absorbance amount of mounting unit 30 is smaller than that of the mounting unit having no through-hole. Thus, a light source whose output is higher than that of the mounting unit having no through-hole can be used.

Since a part of the transmitted beam is absorbed by the lattice-shaped portion to increase the temperature of mounting unit 30, the increase in the output of the light source is limited within a range that will not cause any distortion to the mirror unit or change the rigidity of the beam.

In the optical scanning element according to this embodiment, because of the lattice shape of mounting unit 30, the rigidity of mounting unit 30 is higher than that of mounting units 7 of the optical scanning elements of the first and second exemplary embodiments.

The lattice-shaped frame of mounting unit 30 can be applied to mounting unit 21 of the optical scanning element of the second exemplary embodiment. This can increase the rigidity of mounting unit 21 of the optical scanning element of the second exemplary embodiment.

The aforementioned optical scanning element according to each of the embodiments can be used for a projection display device that forms an image by scanning a screen with a laser beam.

Figure 14:
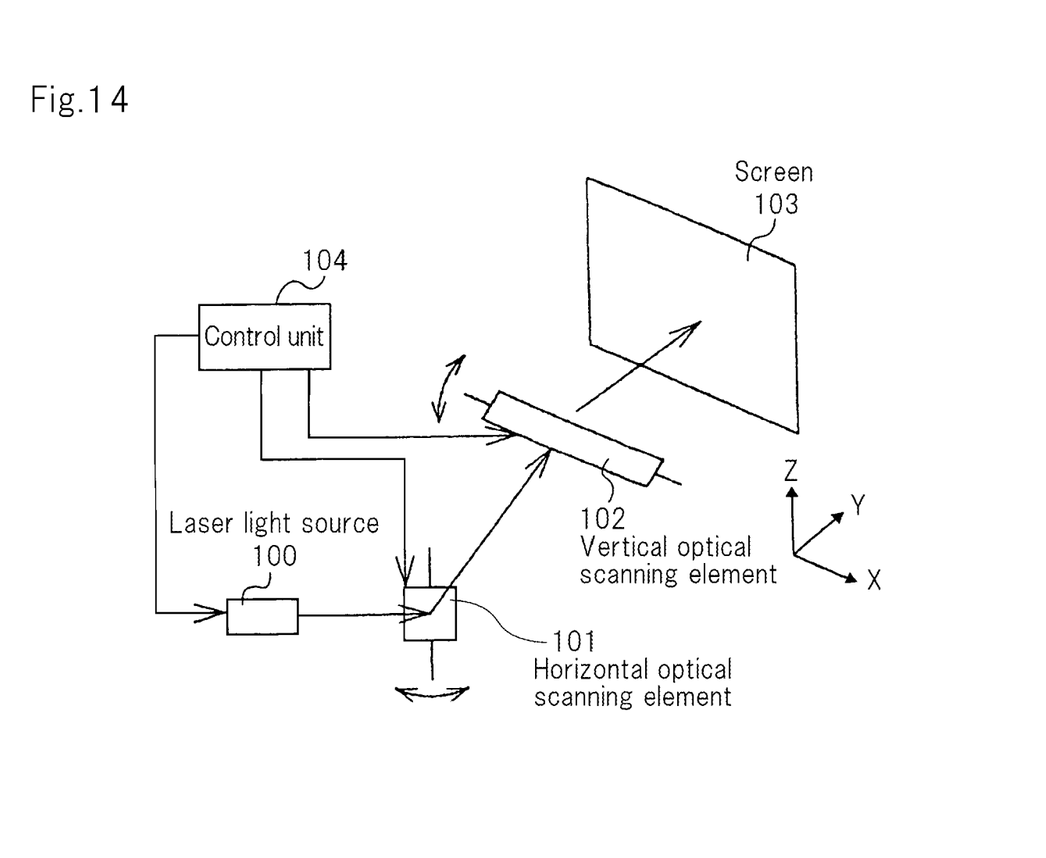
FIG. 14 is a schematic view showing an example of a projection display device that includes the optical scanning element according to the present invention.

FIG. 14 is a schematic view showing the configuration of a projection display device that includes the optical scanning element according to the present invention.

Referring to FIG. 14, the projection display device includes laser light source 100, horizontal optical scanning element 101, vertical optical scanning element 102, screen 103, and control unit 104. It is presumed that the display surface of screen 103 is a two-dimensional plane of X and Z axes and a horizontal direction and a vertical direction on the display screen are respectively an X axis direction and a Z axis direction.

Horizontal optical scanning element 101 and vertical optical scanning element 102 include any of the optical scanning elements of the first to third exemplary embodiments.

Horizontal optical scanning element 101, which is located in the traveling direction of a laser beam emitted from laser light source 100, reflects the laser beam from laser light source 100 toward vertical optical scanning element 102.

Vertical optical scanning element 102, which is located in the traveling direction of the laser beam reflected by horizontal optical scanning element 101, reflects the laser beam from horizontal optical scanning element 101 toward screen 103.

Control unit 104 controls, based on an input video signal from the outside, the light emission timing of laser light source 100 and the rotation of the mirror units of horizontal optical scanning element 101 and vertical optical scanning element 102. When horizontal optical scanning element 101 executes scanning in the horizontal direction, vertical optical scanning element 102 simultaneously executes scanning in the vertical direction, thereby forming a two-dimensional image on screen 103.

The present invention has been described referring to the embodiments. However, the present invention is not limited to the embodiments. Various changes understandable to those skilled in the art can be made to the configuration and the specifics of the present invention.

This application claims priority from Japanese Patent Application No. 2010-126732 filed Jun. 2, 2010, which is hereby incorporated by reference herein in its entirety.

What is claimed is:

1. An optical scanning element comprising:
   a dielectric multilayer film that reflects a part of incident light while transmitting the remainder of the light;
   a first substrate on one surface of which a dielectric multilayer film is formed, and which transmits the remainder of the light passed through the dielectric multilayer film;
   a mounting unit on which the first substrate is mounted; and
   a movable unit which is configured to rotate the mounting unit,
   wherein the mounting unit includes a through-hole at a portion facing the dielectric multilayer film.

2. The optical scanning element according to claim 1, wherein the first substrate includes a concave portion on the other surface opposite the one surface.

3. The optical scanning element according to claim 2, wherein:
   the concave portion includes a plurality of concave portions; and
   the first substrate includes a rib which divides the plurality of concave portions on the other surface.

4. The optical scanning element according to claim 1, wherein the first substrate includes engagement units engaged with predetermined portions of the mounting unit.

5. The optical scanning element according to claim 1, wherein the mounting unit includes a lattice-shaped frame.

6. The optical scanning element according to claim 1, wherein:
   the incident light is a laser beam having a predetermined wavelength region; and
   the first substrate is made of a transparent material in the wavelength region of the laser beam.

7. The optical scanning element according to claim 1, wherein the first substrate is made of any one of $SiO_2$, $CaF_2$, and $MgF_2$.

8. The optical scanning element according to claim 1, wherein:
the movable unit includes:
first and second torsion beams which supports the mounting unit to be rotatable around an axis parallel to a film surface of the dielectric multilayer film; and
a frame-shaped second substrate to which the first and second torsion beams are fixed; and
when seen from a direction vertical to a surface of the second substrate, the mounting unit is located in a center of an opening in the second substrate, and the first and second torsion beams are located to face both sides of the mounting unit.

9. The optical scanning element according to claim 1, wherein the movable unit includes a shaft which rotatably supports the mounting unit and, when seen from a direction vertical to a film surface of the dielectric multilayer film, a ling passing through a cross sectional center of the shaft passes through a center of gravity of the film surface of the dielectric multilayer film.

10. The optical scanning element according to claim 1, further comprising an absorption member that absorbs the remainder of the light transmitted through the dielectric multilayer film and the first substrate and then passed through the through-hole.

11. An image display device comprising:
a light source;
a first optical scanning element that scans a screen with an optical beam from the light source in a first direction;
a second optical scanning element that scans the screen with an optical beam from the first optical scanning element in a second direction intersecting the first direction; and
a control unit that controls, based on an input video signal, the first and second optical scanning elements and irradiation timing of the laser light source,
wherein each of the first and second optical scanning elements includes the optical scanning element according to claim 1.

12. The optical scanning element according to claim 1, wherein the mounting unit includes a surface on which the first substrate is mounted, and wherein the first substrate covers a whole of the surface.

* * * * *